(12) United States Patent
Wong et al.

(10) Patent No.: US 9,450,646 B2
(45) Date of Patent: Sep. 20, 2016

(54) DIRECT POWER TRANSMISSION LOAD MODULATION IN NEAR FIELD COMMUNICATION DEVICES

(71) Applicant: QUALCOMM Incorporated, San Diego, CA (US)

(72) Inventors: Angelica Wong, Palo Alto, CA (US); Faramarz Sabouri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 13/908,875

(22) Filed: Jun. 3, 2013

(65) Prior Publication Data

US 2014/0273830 A1 Sep. 18, 2014

Related U.S. Application Data

(60) Provisional application No. 61/799,303, filed on Mar. 15, 2013.

(51) Int. Cl.
*H04B 5/00* (2006.01)
*G06K 7/00* (2006.01)
*G06K 19/07* (2006.01)

(52) U.S. Cl.
CPC ........... *H04B 5/0031* (2013.01); *G06K 7/0008* (2013.01); *G06K 19/0723* (2013.01)

(58) Field of Classification Search
CPC .................. H04B 5/0031; G06K 19/0723
USPC ........................................ 455/41.1
See application file for complete search history.

(56) References Cited

U.S. PATENT DOCUMENTS

| | | | |
|---|---|---|---|
| 3,685,050 A | 8/1972 | Cartwright | |
| 8,283,975 B2 | 10/2012 | Witschnig et al. | |
| 8,351,854 B2 | 1/2013 | Moosavi | |
| 2005/0113044 A1* | 5/2005 | Gila et al. | 455/127.1 |
| 2006/0063490 A1* | 3/2006 | Bader | H04B 1/0483 455/45 |
| 2007/0159303 A1 | 7/2007 | Tyulpanov | |
| 2009/0137219 A1 | 5/2009 | Williams | |
| 2010/0130127 A1 | 5/2010 | Takayama | |
| 2013/0002033 A1 | 1/2013 | Fuchs | |
| 2013/0052948 A1 | 2/2013 | Fuchs | |

OTHER PUBLICATIONS

International Search Report and Written Opinion—PCT/US2014/022838—ISA/EPO—Jul. 16, 2014.

* cited by examiner

*Primary Examiner* — Eugene Yun
(74) *Attorney, Agent, or Firm* — Paradice and Li LLP

(57) ABSTRACT

An NFC initiator device requests a passive communication mode by modulating a request onto a first carrier signal. In response thereto, the target device transmits a second carrier signal while still receiving the first carrier signal from the initiator device. The target device may modulate data onto the second carrier signal to convey information to the initiator device. The initiator device may detect changes in the load provided by the target device to interpret the data conveyed by the target device.

24 Claims, 9 Drawing Sheets

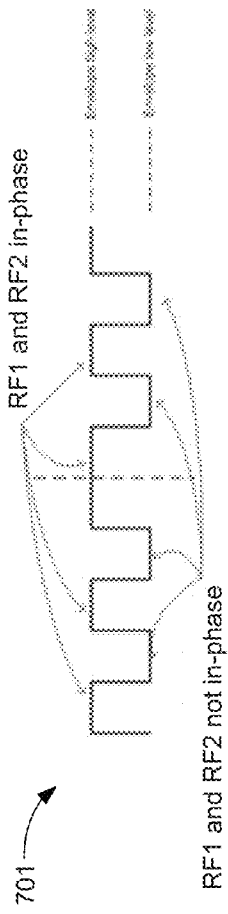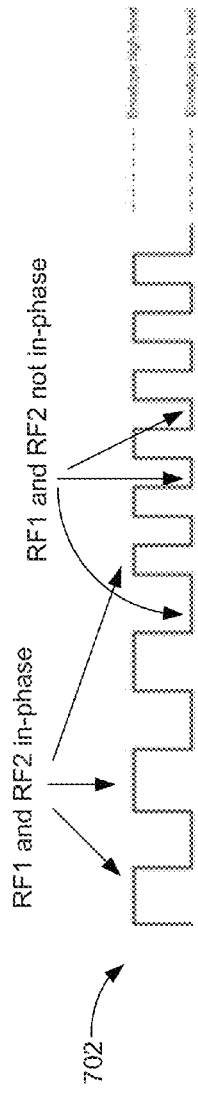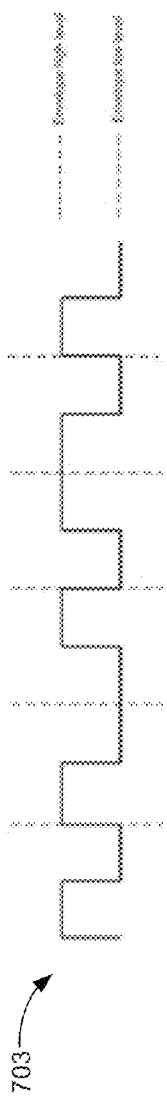

| modulation modes | Envelope High Level | Envelope Low Level |
|---|---|---|
| OOK modulated subcarrier | carrier in-phase | carrier out-of-phase |
| OOK modulated subcarrier | carrier in-phase | carrier OFF |
| OOK modulated subcarrier | carrier OFF | carrier out-of-phase |
| BPSK modulated subcarrier | carrier in-phase | carrier out-of-phase |
| BPSK modulated subcarrier | carrier in-phase | carrier OFF |
| BPSK modulated subcarrier | carrier OFF | carrier out-of-phase |
| FSK modulated subcarrier | carrier in-phase | carrier out-of-phase |
| FSK modulated subcarrier | carrier in-phase | carrier OFF |
| FSK modulated subcarrier | carrier OFF | carrier out-of-phase |
| Manchested encoded without subcarrier | carrier in-phase | carrier out-of-phase |
| Manchested encoded without subcarrier | carrier in-phase | carrier OFF |
| Manchested encoded without subcarrier | carrier OFF | carrier out-of-phase |

800

FIG. 8

DIRECT POWER TRANSMISSION LOAD MODULATION IN NEAR FIELD COMMUNICATION DEVICES

CROSS-REFERENCE TO RELATED APPLICATIONS

This application claims the benefit under 35 USC 119(e) of the co-pending and commonly owned U.S. Provisional Application No. 61/799,303 entitled "DIRECT POWER TRANSMISSION LOAD MODULATION IN NEAR FIELD COMMUNICATION DEVICES" filed on Mar. 15, 2013, the entirety of which is incorporated by reference herein.

TECHNICAL FIELD

The present embodiments relate generally to near-field communications (NFC), and specifically to increasing the range of NFC transmissions.

BACKGROUND OF RELATED ART

NFC technology allows for wireless communications between a mobile device (e.g., an NFC-enabled mobile phone or a smart card with an NFC/RFID tag) and an NFC reader (e.g., in a point-of-sale terminal or another mobile device) over a distance of several centimeters or less. To establish an NFC connection between an initiator device and a target device, both devices may follow a number of NFC standards (e.g., the ISO/IEC 18092 and ECMA-340 standards). Currently, there are two NFC communication modes: passive communication mode and active communication mode. In the passive communication mode, the initiator device generates a carrier signal and the target device sends data to the initiator device by load modulating the initiator device's carrier signal. Because the target device does not generate its own carrier signal, the target device may operate in the passive communication mode without transmitting power. In the active communication mode, both the initiator device and the target device communicate by alternately generating their own carrier signals, thereby distributing power consumption between the initiator and target devices.

Because the target device in an NFC passive communication mode may consume significantly less power, the passive communication mode is often used when the initiator device has a plentiful power supply (e.g., an electrical outlet) and the target device has a limited power supply (e.g., a battery) or no power supply. However, because passive load modulation depends upon the inductive coupling between the respective antennas of the initiator device and the target device, the effective modulation associated with data transfers using passive load modulations may be lower than data transfers using the active communication mode or direct power transmission. In addition, the desire to perform effective data transfers using passive load modulation may undesirably limit the extent to which the antenna of the target device can be reduced (e.g., because reducing the size of the target device's antenna may decrease the amount of inductive coupling between the target device and the initiator device).

Accordingly, there is a need to increase the power level of signals exchanging data in response to a request for the NFC passive communication mode.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus are disclosed that may increase power levels of NFC data transmissions between an initiator device and a target device in response to a request for an NFC passive communication mode (e.g., as compared to conventional NFC passive communication mode operations). The increased power levels may allow for a reduction in the antenna size of the target device without performance degradations (e.g., as compared with conventional NFC modes). In accordance with the present embodiments, the initiator device may request the NFC passive communication mode, for example, by modulating a polling command onto a first carrier signal generated by the initiator device. After sending the polling command to the target device, the initiator device continues to transmit the first carrier signal. The target device receives the polling command requesting the passive communication mode. In response thereto, the target device transmits a second carrier signal while still receiving the first carrier signal from the initiator device. The target device may modulate data onto the second carrier signal to convey information to the initiator device. The initiator device may detect changes in the load provided by the target device to interpret the data conveyed by the target device.

More specifically, the modulated second carrier signal generated by the target device may be superimposed with the un-modulated first carrier signal generated by the initiator device to generate a composite waveform embedded with information transmitted from the target device to the initiator device. For some embodiments, the amplitude and/or phase of the resulting composite waveform may be used to interpret the data transmitted from the target device. The phase relationship between the first and second carrier signals may determine or control the amplitude of the resulting composite waveform detected by the initiator device. For example, when the first and second carrier signals are in-phase with each other, the amplitude of the resulting composite waveform may be at a relatively high value (e.g., above a certain threshold) to indicate a first data value; conversely, when the first and second carrier signals are out of phase with each other, the amplitude of the resulting composite waveform may be at a relatively low value (e.g., below a certain threshold) to indicate a second data value.

For some embodiments, the target device may recover clock information from the first carrier signal received from the initiator device, and then use the recovered clock information to generate the second carrier signal. In this manner, the target device may not need its own clock generator. Further, for some embodiments, the target device may generate a pulse-width modulated (PWM) signal that indicates data to be modulated onto the second carrier signal.

BRIEF DESCRIPTION OF THE DRAWINGS

The present embodiments are illustrated by way of example and are not intended to be limited by the figures of the accompanying drawings.

FIG. 7A is a waveform diagram depicting binary phase-shift keying (BPSK) encoding operations employed by some embodiments.

FIG. 7B is a waveform diagram depicting frequency shift keying (FSK) encoding operations employed by some embodiments.

FIG. 7C is a waveform diagram depicting Manchester encoding operations employed by some embodiments.

FIG. 8 is a table summarizing a number of sub-carrier modulation modes that may be employed by NFC devices in accordance with the present embodiments.

Like reference numerals refer to corresponding parts throughout the drawings and specification.

DETAILED DESCRIPTION

Figure 1A:
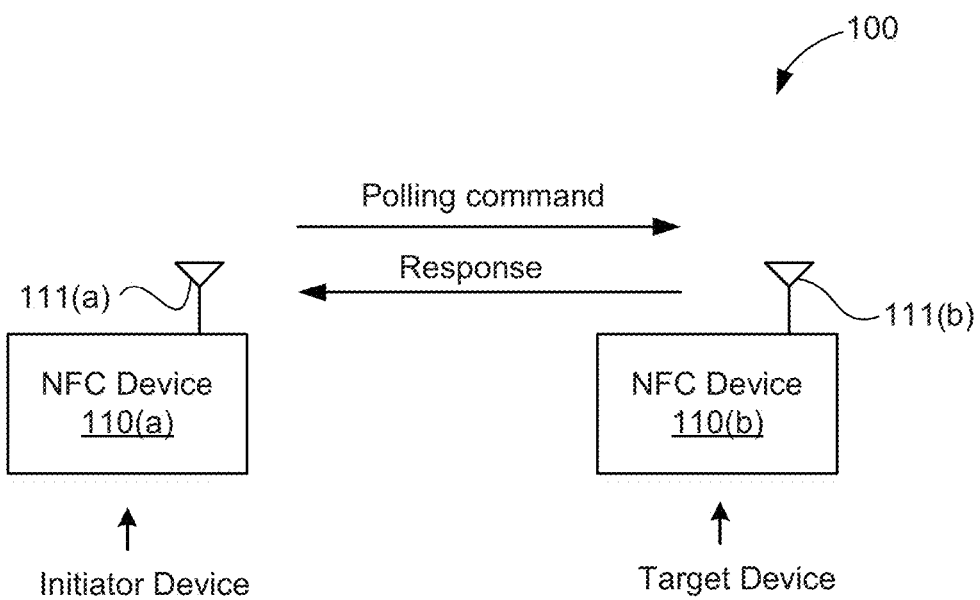
FIGS. 1A and 1B are block diagrams of an NFC system that includes two NFC-enabled devices in accordance with some embodiments.

The present embodiments are discussed below in the context of establishing a near field communication (NFC) connection between two NFC-enabled devices. It is to be understood that the present embodiments are equally applicable to other wireless communication technologies and/or standards. In the following description, numerous specific details are set forth such as examples of specific components, circuits, and processes to provide a thorough understanding of the present disclosure. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

The term "coupled" as used herein means connected directly to or connected through one or more intervening components or circuits. The term "NFC" as used herein refers to various communications governed by various NFC protocols including, for example, ISO/IEC 18092, ECMA-340, and/or standards defined by the NFC Forum. Further, as used herein, the term "initiator device" refers to an NFC-enabled device that initiates an NFC connection (e.g., by transmitting a polling command to another NFC-enabled device), and the term "target device" refers to an NFC-enabled device that responds to a request from the initiator device (e.g., by transmitting its own carrier signal or by altering the inductive load on the initiator device).

To initiate an NFC connection with a target device, an initiator device transmits an un-modulated radio frequency (RF) carrier signal for an active RF guard time (currently set to approximately 5 ms), and then modulates the carrier signal to embed a polling command (e.g., a request frame) that requests either the active communication mode or the passive communication mode. According to current NFC standards, if the initiator device requests the active communication mode, the initiator device terminates transmission of its carrier signal after transmitting the polling command, and then the target device transmits data to the initiator device by generating and modulating its own RF carrier signal. Thus, in the active communication mode, the initiator device and the target device alternately transmit their own carrier signals (i.e., such that only one of the devices transmits a carrier signal at any given time). Conversely, according to current NFC standards, if the initiator device requests the passive communication mode, the initiator device continues transmitting its un-modulated carrier signal after modulating the polling command, and the target device transmits data to the initiator device by load modulating the initiator device's carrier signal. Accordingly, for the active communication mode, power consumption may be shared between the initiator device and the target device, while for the passive communication mode, the target device consumes very little (if any) power because it does not generate its own carrier signal.

FIG. 1A shows an NFC system 100 that includes two NFC-enabled devices 110(a) and 110(b) in accordance with some embodiments. NFC device 110(a) is equipped with a first NFC antenna 111(a), and NFC device 110(b) is equipped with a second NFC antenna 111(b). Antennas 111(a) and 111(b) are capable of exchanging wireless communication signals in the near field with other NFC antennas in other NFC devices. When the antennas 111(a) and 111(b) of NFC devices 110(a) and 110(b) are brought near each other (e.g., within a few centimeters of each other), they become inductively coupled. Once inductively coupled, the two antennas 111(a) and 111(b) may operate as an air-core transformer that allows NFC devices 110(a) and 110(b) to perform near-field communication with each other. The inductive coupling between antennas 111(a) and 111(b) may be measured using the well-known inductive coupling coefficient (K); the two antennas 111(a) and 111(b) are considered to be inductively coupled to a degree sufficient for near-field communication if the value of K satisfies a threshold (e.g., if K is at least 0.05). For some embodiments, the antennas 111(a) and 111(b) may be loop antennas that allow for radio frequency (RF) transmission and reception, although other well-known antennas can be used.

Figure 1B:
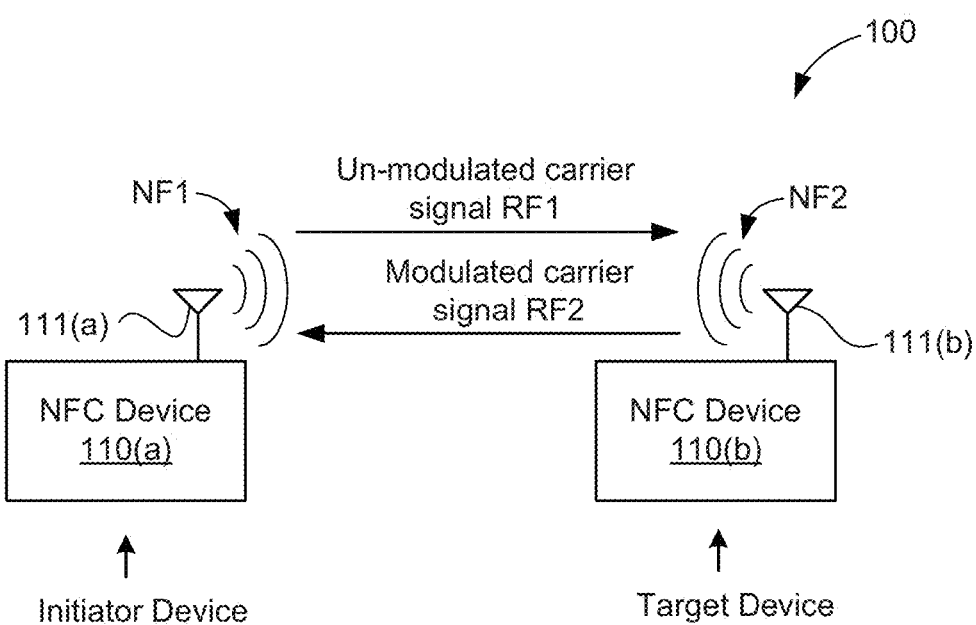

NFC devices 110(a) and 110(b) may be any suitable devices that can communicate with each other wirelessly according to NFC protocols or standards. For example, in some embodiments, both NFC devices 110(a) and 110(b) are mobile devices (e.g., cellular phones, personal digital assistants, or other mobile devices). In other embodiments, NFC device 110(a) is an NFC reader situated, for example, in a point of sale (POS) terminal, and NFC device 110(b) is a mobile device or NFC tag. For the exemplary embodiments described below, NFC device 110(a) is designated as the initiator device, and NFC device 110(b) is designated as the target device (as depicted in FIGS. 1A-1B). For other embodiments, NFC device 110(a) may operate as the target device, and NFC device 110(b) may operate as the initiator device.

FIG. 1B depicts the two NFC-enabled devices 110(a) and 110(b) of system 100 generating their own carrier signals during a modified NFC passive communication mode in accordance with the present embodiments. After requesting the NFC passive communication mode, the initiator device 110(a) continues transmitting its un-modulated carrier signal RF1, thereby generating a first near field NF1 emanating from the initiator device 110(a). In response to the request for the NFC passive communication mode, the target device 110(b) generates and transmits its own carrier signal RF2, thereby generating a second near field NF2 emanating from the target device 110(b). This is in contrast to conventional NFC passive communication mode operation, which calls for the target device to load modulate the initiator device's carrier signal (instead of generating its own carrier signal).

For purposes of discussion herein, the carrier signals RF1 and RF2 are radio-frequency (RF) carrier signals having a frequency of 13.56 MHz (as specified by current NFC standards), although other carrier signals and/or frequencies may be used.

The target device 110(b) may modulate its own carrier signal RF2 with data to be transmitted to the initiator device 110(a). The modulated carrier signal RF2 generated by the target device 110(b) may be superimposed with the un-modulated carrier signal RF1 generated by the initiator device 110(a) to generate a composite waveform embedded with information transmitted from the target device 110(b) to the initiator device 110(a). For some embodiments, the amplitude and/or phase of the resulting composite waveform, as detected by the initiator device 110(a), may be used to interpret the data transmitted from the target device 110(b). For other embodiments, one or more other characteristics of the resulting composite waveform may be detected by the initiator device 110(a) to interpret information transmitted from the target device 110(b).

The phase relationship between the two carrier signals RF1 and RF2 may determine or control the amplitude of the resulting composite waveform detected by the initiator device 110(a). For example, when the two carrier signals RF1 and RF2 are in-phase with each other, the amplitude of the resulting composite waveform may be at a relatively high value (e.g., above a certain threshold); conversely, when the two carrier signals RF1 and RF2 are 180 degrees out of phase with each other, the amplitude of the resulting composite waveform may be at a relatively low value (e.g., below a certain threshold). The power level of the composite waveform detected by the initiator device 110(a) may be greater than that of either of the individual carrier signals RF1 and/or RF2, which in turn may increase data integrity and wireless range (e.g., as compared to conventional NFC passive communication mode operation). In addition, the greater power level of the composite waveform may also allow the size of the antenna 111(b) of the target device 110(b) to be reduced without any performance degradation (e.g., as compared with conventional active and/or passive communication modes defined by the current NFC standards).

For some embodiments, the target device 110(b) may align the phase of its carrier signal RF2 with the carrier signal RF1 generated by the initiator device 110(a) to indicate a first bit value (e.g., a logic 1), and may misalign the phase of its carrier signal RF2 with the carrier signal RF1 generated by the initiator device 110(a) by 180 degrees to indicate a second bit value (e.g., a logic 0). For other embodiments, the target device 110(b) may employ a plurality of phase offsets to convey a plurality of data values. For example, the target device 110(b) may employ N phase offsets to convey a number $M=\log_2 N$ data values.

The modified NFC passive communication mode disclosed herein is in contrast to the conventional NFC passive communication mode. For example, while current NFC standards specify that only the NFC initiator device transmits its own carrier signal during the passive communication mode, both the initiator device 110(a) and the target device 110(b) may simultaneously generate and transmit their own carrier signals RF1 and RF2, respectively, when operating in accordance with the present embodiments. The modified NFC passive communication mode disclosed herein is also in contrast to the conventional NFC active communication mode. For example, while current NFC standards specify that the NFC initiator device and the NFC target device alternately transmit their own carrier signals during the active communication mode (e.g., only one of the two NFC devices is to transmit its carrier signal at any given time), both the initiator device 110(a) and the target device 110(b) may simultaneously generate and transmit their own carrier signals RF1 and RF2, respectively, when operating in accordance with the present embodiments.

Further, it is noted that when the target device 110(b) transmits data to the initiator device 110(a) by super-positioning its modulated carrier signal RF2 with the un-modulated carrier signal RF1 generated by the initiator device 110(a), the initiator device 110(a) may interpret the received data in the same manner as that during conventional NFC passive communication mode operations. In other words, the initiator device 110(a) may not be aware that the target device 110(b) is transmitting data in a manner different than that specified by the current NFC standards.

Figure 2:
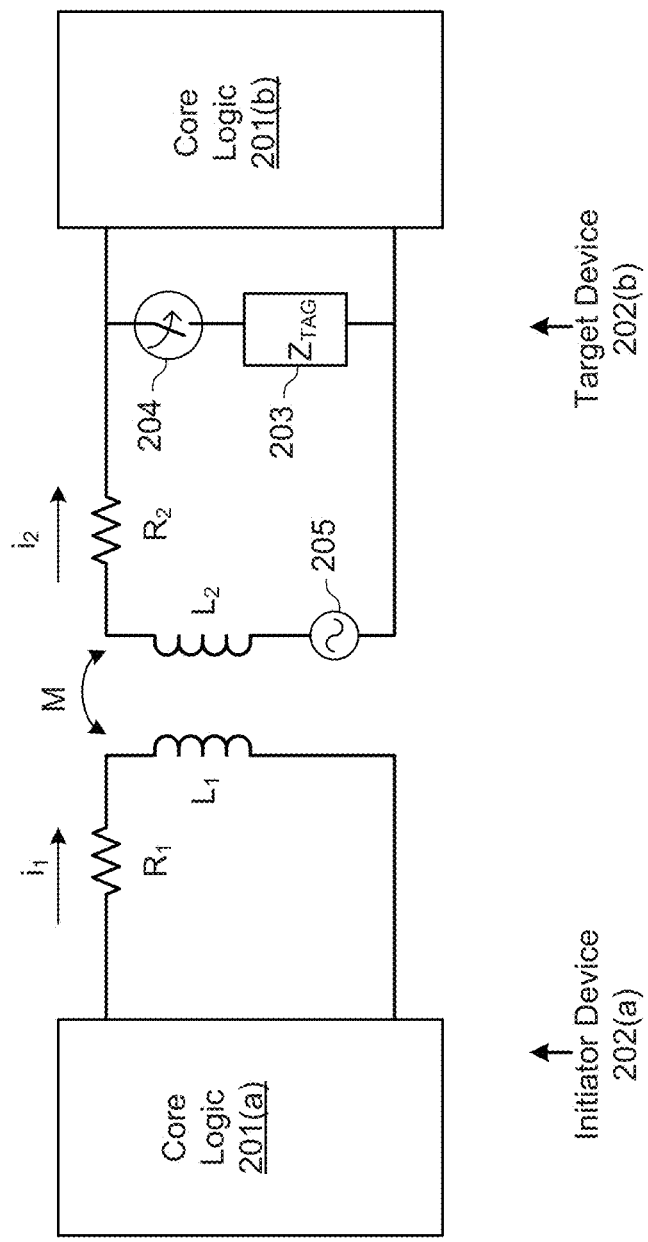
FIG. 2 shows equivalent circuits for the NFC devices of FIGS. 1A and 1B in accordance with some embodiments.

FIG. 2 shows NFC devices 202(a) and 202(b) that may represent equivalent circuits for portions of the NFC devices 110(a) and 110(b), respectively, of FIGS. 1A-1B. NFC device 202(a) is shown to include core logic 201(a), a resistor $R_1$, and an inductor $L_1$. NFC device 202(b) is shown to include core logic 201(b), a resistor $R_2$, an inductor $L_2$, a load element 203, a switch 204, and a signal generator 205.

More specifically, the antenna 111(a) of NFC device 110(a) of FIGS. 1A-1B may be modeled by the first inductor $L_1$ of FIG. 2, and the antenna 111(b) of NFC device 110(b) of FIGS. 1A-1B may be modeled by the second inductor $L_2$ of FIG. 2. The two inductors $L_1$ and $L_2$ are mutually inducted, and have a mutual inductance value of M. The resistors $R_1$ and $R_2$ may be damping resistors. The signal generator 205 may represent a voltage ($V_{emf}$) induced in target device 202(b) caused by a changing (e.g., time-varying) current flow in the initiator device 202(a). The load element 203, which has an impedance represented by $Z_{TAG}$, may represent a switchable load in the target device 202(b). When target device 202(b) operates in the conventional NFC passive communication mode, the load element 203 may be switched between loaded and unloaded states by the switch 204 to selectively load modulate the carrier signal RF1 transmitted from the initiator device 202(a).

When NFC devices 202(a) and 202(b) are inductively coupled, the voltage across the antenna of the initiator device 202(a) may be expressed as $V_R = i_1(R_1 + j\omega L_1) - j\omega M i_2$, and the induced current ($i_2$) in the target device 202(b) may be expressed as $$i_2 = \frac{j\omega M i_1}{R_2 + j\omega L_2 + Z_{Tag}}.$$

The terms $j\omega M i_2$ and $j\omega M i_1$ are induced voltages in respective inductors $L_1$ and $L_2$. Thus, the voltage across the antenna of the initiator device 202(a) may be expressed as $$V_R = i_1\left(R_1 + j\omega L_1 + \frac{\omega^2 M^2}{R_2 + j\omega L_2 + Z_{Tag}}\right).$$

When target device 202(b) is operating in the conventional passive communication mode (e.g., as specified by current NFC standards), the target device 202(b) may transmit data to the initiator device 202(a) by load modulating the carrier signal provided by the initiator device 202(a). More specifically, target device 202(b) may alternately close the switch 204 to connect the load element 203 across its antenna (e.g., thereby load modulating the initiator device 202(a)'s carrier signal RF1) and open the switch 204 to disconnect the load element 203 (e.g., thereby not load modulating the initiator device 202(a)'s carrier signal RF1). The resulting voltage across the antenna of the initiator device 202(a) may be expressed as:

$$V_{LMA} = \left|i_{1,ON}\left(R_1 + j\omega L_1 + \frac{\omega^2 M^2}{R_2 + j\omega L_2 + Z_{Tag,ON}}\right)\right| - \left|i_{1,OFF}\left(R_1 + j\omega L_1 + \frac{\omega^2 M^2}{R_2 + j\omega L_2 + Z_{Tag,OFF}}\right)\right|,$$

where $i_{1ON}$ indicates the current in initiator device 202(a) when the load element 203 is coupled across the antenna of target device 202(b), $i_{1OFF}$ indicates the current in initiator device 202(a) when the load element 203 is not coupled across the antenna of target device 202(b), $Z_{TAG,ON}$ is the impedance of the load element 203 when coupled across the antenna of target device 202(b), and $Z_{TAG,OFF}$ is the impedance of the load element 203 when not coupled across the antenna of target device 202(b).

Accordingly, when the target device 202(b) selectively couples the load element 203 across its antenna, the current $i_2$ through inductor $L_2$ of target device 202(b) changes and causes changes in the voltage across the inductor $L_1$ of initiator device 202(a). The initiator device 202(a) may therefore interpret data transmitted (via load modulation) from the target device 202(b) by detecting voltage changes across its antenna (e.g., across inductor $L_1$). For example, when the load element 203 is not coupled across the inductor $L_2$ of target device 202(b), loading on the initiator device 202(a) decreases and therefore the voltage across the inductor $L_1$ of the initiator device 202(a) is relatively small (e.g., less than a threshold). Conversely, when the load element 203 is coupled across the inductor $L_2$ of target device 202(b), loading on the initiator device 202(a) increases and therefore the voltage across the inductor $L_1$ of the initiator device 202(a) is relatively large (e.g., greater than a threshold).

Figure 3:
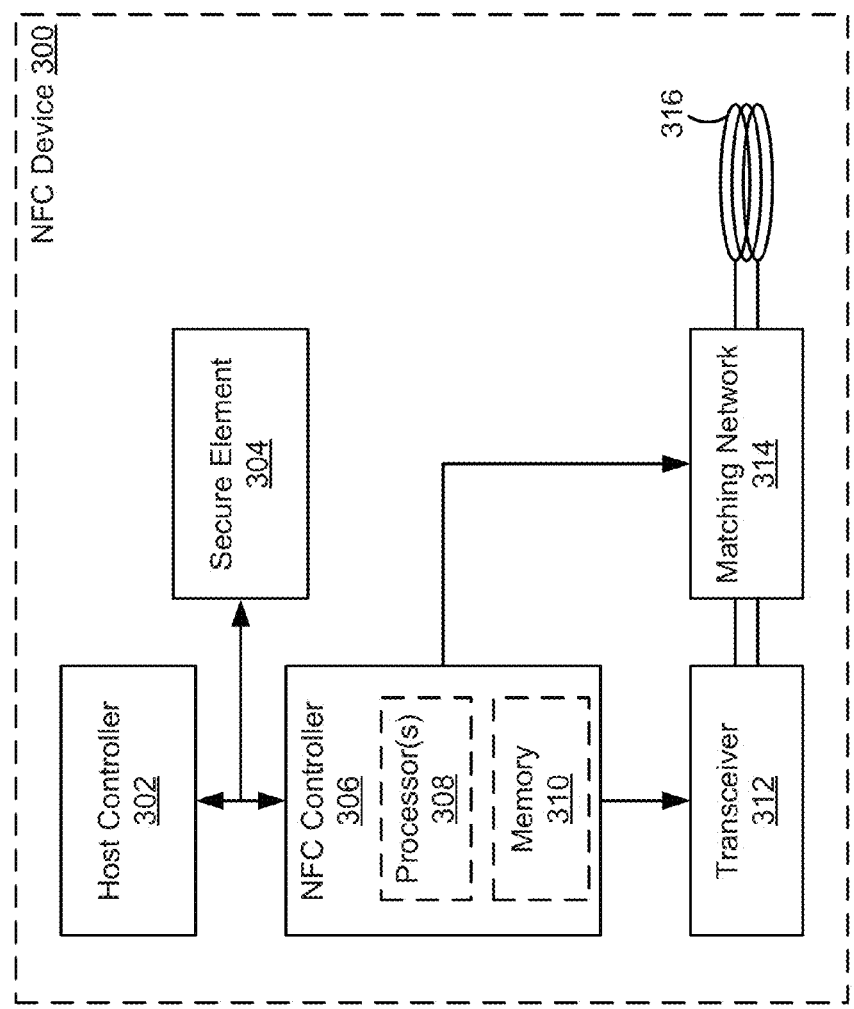
FIG. 3 is a functional block diagram of an NFC device in accordance with some embodiments.

FIG. 3 shows an NFC device 300 that is one embodiment of NFC device 110(b) of FIG. 1. NFC device 300 includes an NFC controller 306, which includes one or more processors (or processor cores) 308 and memory 310. The memory 310 includes instructions that, when executed by the one or more processors 308, cause the NFC controller 306 to implement communications according to current NFC standards (e.g., as specified in standards such as ISO/IEC 18092, ECMA-340, and/or standards defined by the NFC Forum) and/or communications described herein in accordance with the present embodiments. In some embodiments, these instructions may be stored in a non-transitory computer-readable medium (e.g., one or more non-volatile memory devices) in the memory 310. The NFC controller 306 is coupled to and controls a transceiver 312, which in turn is coupled to an NFC antenna 316 through a matching network 314. Antenna 316, which is depicted in FIG. 3 as a loop antenna that acts as an inductor, is one embodiment of antennas 111(a) and 111(b) of FIGS. 1A-1B. During communication with another NFC device, the NFC controller 306 may encode data and provide the encoded data to transceiver 312 for transmission from antenna 316, and/or may decode data received from antenna 316 via transceiver 312.

More specifically, the transceiver 312 may be used to generate and/or modulate data onto a carrier signal to be transmitted to another device via antenna 316, and may be used to receive and demodulate data from a carrier signal received by antenna 316. For one example, transceiver 312 may be used to load modulate data onto a carrier signal transmitted from another device (e.g., when communicating in the conventional NFC passive communication mode). For another example, transceiver 312 may be used to modulate the carrier signal RF2 generated by the NFC device 300 (e.g., when communicating in the modified NFC passive communication mode described herein).

The NFC controller 306 is also coupled to the matching network 314, and may provide control signals to the matching network 314 to tune the matching network 314. For example, a capacitance of the matching network 314 may be varied based on a control signal from the NFC controller 306. The matching network 314 and antenna 316 form a resonant circuit, which is sometimes referred to as a tank circuit. The tank circuit may be resonated by applying a signal (e.g., an oscillating signal) to it from the transceiver 312. By tuning the matching network 314, the resonance frequency and/or resonance quality factor (i.e., the well-known Q-factor) of the tank circuit may be varied.

The NFC device 300 may also include a host controller 302 to execute one or more applications, which may involve near-field communications. The NFC device 300 may further include a secure element 304 to store NFC data. In additional, the NFC device 300 may include other components not shown in FIG. 3. For example, the NFC device 300 may include one or more other antennas (e.g., for cellular communications or communications using a wireless local area network such as WiFi).

Figure 4:
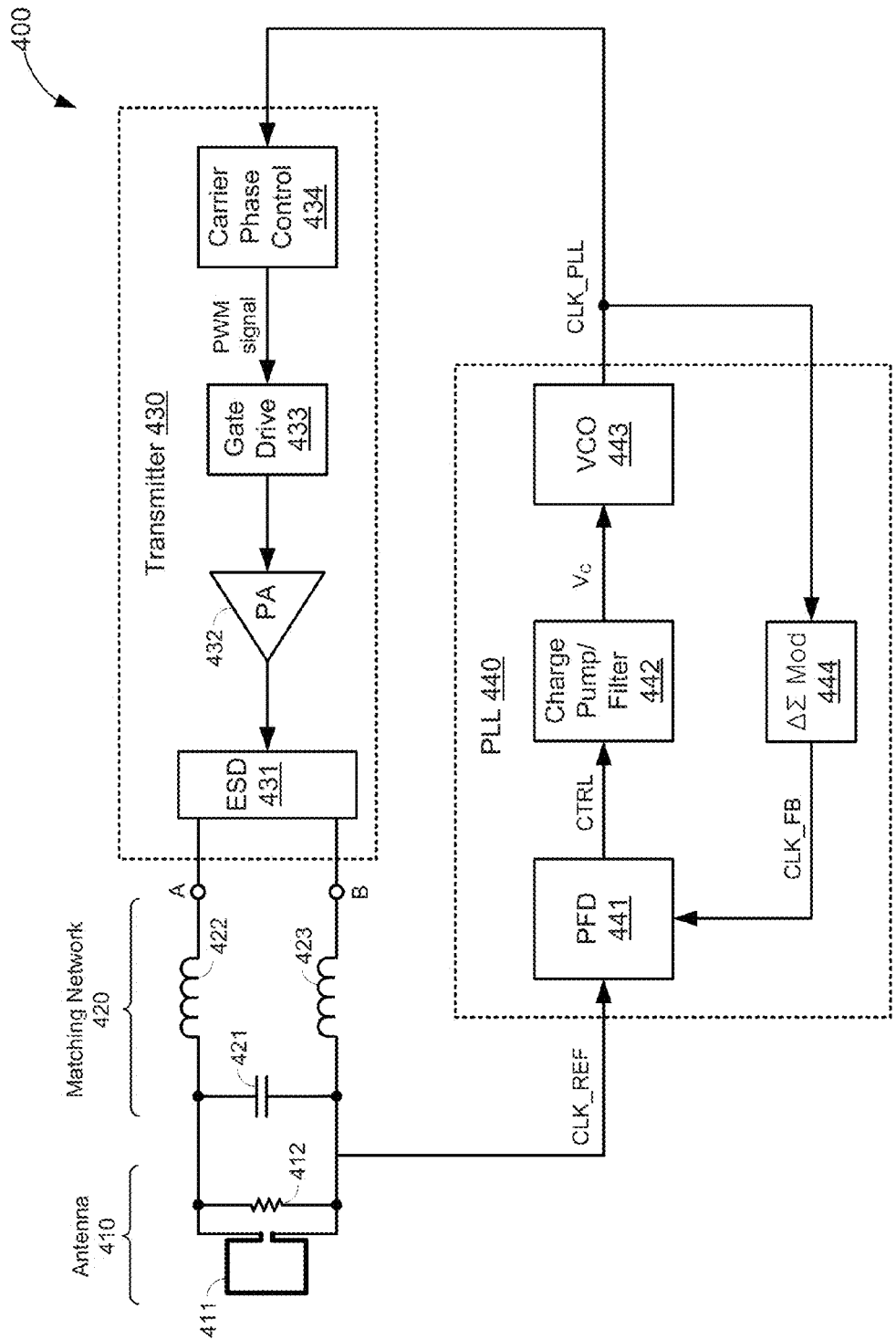
FIG. 4 is a more detailed block diagram of an NFC device in accordance with some embodiments.

FIG. 4 is a circuit diagram of an NFC device 400 that is at least one embodiment of NFC target device 110(b) of FIGS. 1A-1B and/or NFC device 300 of FIG. 3. NFC device 400 is shown to include an antenna 410, a matching network 420, a transmitter 430, and a phase-locked loop (PLL) circuit 440. The NFC device 400 may include other components not shown in FIG. 4.

Antenna 410, which may be one embodiment of antenna 111(b) of FIGS. 1A-1B and/or antenna 316 of FIG. 3, includes an inductive loop 411 and a resistor 412. The inductive loop 411 may be inductively coupled to an antenna of an NFC initiator device when NFC device 400 is brought within the near field of the initiator device (not shown in FIG. 4 for simplicity). The resistor 412, which is coupled across the inductive loop 411, may be a de-Q'ing resistor (e.g., that flattens the signal response of antenna 410 by reducing the Q factor of the corresponding resonant circuit).

Matching network 420 may include several capacitors 421 and two inductors 422-423. The capacitor 421 is coupled across the inductive loop 411. Together, the inductive loop 411 and capacitor 421 may form a resonant circuit (which may also be referred to as a tank circuit). The first inductor 422 is coupled between a first terminal of the inductive loop 411 and a first output terminal (A) of the transmitter 430, and the second inductor 423 is coupled between a second terminal of the inductive loop 411 and a second output terminal (B) of the transmitter 430.

Although not shown for simplicity, the matching network 420 may include a plurality of additional capacitors, resistors, and/or inductors that may be used to tune the matching network 420, to compensate for temperature or process variations, to calibrate one or more components of device 400, and/or for other purposes.

The transmitter 430, which may form a portion of the transceiver 312 of FIG. 3, is shown to include an electrostatic discharge (ESD) circuit 431, a power amplifier (PA) 432, a gate drive circuit 433, and a carrier phase control circuit 434. The power amplifier 432, which may be any suitable amplifier, is coupled to the matching network 420 through the ESD circuit 431, and includes an input coupled to an output of the gate drive circuit 433. The gate drive circuit 433, which may be any suitable driver circuit, includes an input coupled to an output of the carrier phase control circuit 434. The carrier phase control circuit 434 includes an input to receive a clock signal (CLK_PLL) provided by the PLL circuit 440. For other embodiments, the carrier phase control circuit 434 may receive other suitable clock signals that may be provided from other devices (e.g., the initiator device) or that may be generated within the NFC device 400 (e.g., using a local crystal oscillator).

The PLL circuit 440 is shown to include a phase and frequency detector (PFD) 441, a charge pump/filter circuit 442, a voltage-controlled oscillator (VCO) 443, and a divide-by-N/delta-sigma modulator circuit 444. For some embodiments, the modulator circuit 444 may be omitted. The PFD 441 includes inputs to receive a reference clock signal (CLK_REF) received from an NFC initiator device (e.g., initiator device 110(a) of FIGS. 1A-1B) and to receive a feedback clock signal (CLK_FB), and includes an output to generate a control signal (CTRL). Charge pump/filter circuit 442 includes an input to receive the control signal CTRL, and includes an output to generate a control voltage ($V_C$). The VCO 443 includes an input to receive the control voltage $V_C$, and includes an output to generate CLK_PLL. The clock signal CLK_PLL is provided to an input of modulator circuit 444, which in response thereto generates the feedback clock signal (CLK_FB).

The PFD 441 compares the phase relationship of CLK_REF with CLK_FB to generate the control signal (CTRL), which for some embodiments may include up (UP) and down (DN) control signals. The control signal CTRL is used by the charge pump/filter circuit 442 to generate a value of $V_c$ that is indicative of the phase relationship between CLK_REF and CLK_FB. The VCO 443 may adjust the phase (and/or frequency) of the clock signal CLK_PLL in response to the control voltage $V_c$. The modulator circuit 444 may frequency divide the clock signal CLK_PLL to generate the feedback clock signal CLK_FB.

Figure 5:
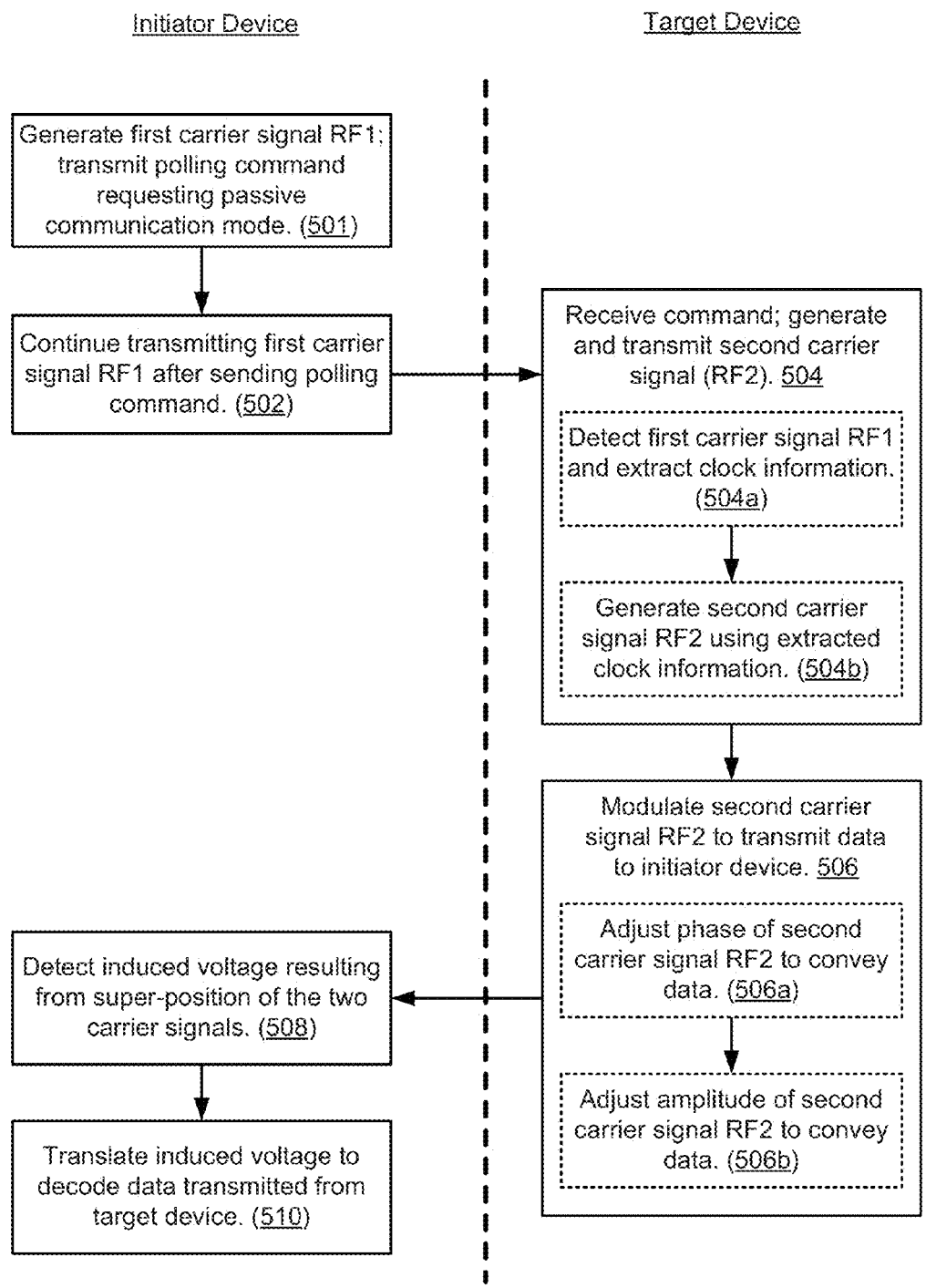
FIG. 5 is an illustrative flow chart depicting an exemplary NFC communication operation in accordance with the present embodiments.

An exemplary operation of NFC device 400 in accordance with the present embodiments is described below with respect to the illustrative flow chart 500 of FIG. 5, with reference also to FIGS. 1B and 4. For the exemplary operation described below, NFC device 400 operates as the target device, and NFC device 110(a) of FIG. 1B operates as the initiator device.

First, the initiator device 110(a) generates an un-modulated first carrier signal RF1 (e.g., for an active RF guard time period), and then transmits a polling command requesting an NFC passive communication mode (e.g., by modulating the first carrier signal RF1) (501). The initiator device 110(a) continues transmitting the un-modulated first carrier signal RF1 after transmitting the polling command (502). In this manner, the initiator device 110(a) continues generating its own near field NF1 (e.g., as depicted in FIG. 1B) after sending the polling command to the target device 400.

In response to the request for the NFC passive communication mode, the target device 400 generates and transmits its own carrier signal RF2, thereby generating its own near field NF2 (e.g., as depicted in FIG. 1B) (504). For some embodiments, target device 400 may receive the first carrier signal RF1 from the initiator device 110(a) and extract clock information from the first carrier signal RF1 (504a). More specifically, the first carrier signal RF1 may be detected by antenna 410 of NFC device 400 and provided to the PLL circuit 440 as the reference clock signal CLK_REF. The PLL circuit 440 may phase lock its output signal CLK_PLL with CLK_REF, thereby recovering clock information from the first carrier signal RF1 generated by the initiator device 110(a). In this manner, the PLL circuit 440 may be used to generate the second carrier signal RF2 to be transmitted from the target device 400 (504b). The ability of target device 400 to use clock information recovered from the first carrier signal RF1 to generate the second carrier signal RF2 may eliminate the need for the target device 400 to include its own clock generator.

Then, the target device 400 may modulate its own carrier signal RF2 with data to be transmitted to the initiator device 110(a) (506). For some embodiments, the target device 400 may adjust the phase of the second carrier signal RF2 with respect to the first carrier signal RF1 transmitted from the initiator device 110(a) to convey data to be transmitted (506a), and/or may adjust the amplitude of the second carrier signal RF2 with respect to the first carrier signal RF1 transmitted from the initiator device 110(a) to convey data to be transmitted (506b).

For example, the target device 400 may indicate a first logic state by phase aligning the second carrier signal RF2 with the first carrier signal RF1 generated by the initiator device 110(a), and may indicate a second logic state by delaying the phase of the second carrier signal RF2 so that the second carrier signal RF2 is 180 degrees out of phase with first carrier signal generated by the initiator device 110(a). More specifically, when the two carrier signals RF1 and RF2 are in-phase with each other, the amplitude of the resulting composite waveform may be at a relatively high value (e.g., above a certain threshold) that is detectable by the initiator device 110(a); conversely, when the two carrier signals RF1 and RF2 are 180 degrees out of phase with each other, the amplitude of the resulting composite waveform may be at a relatively low value (e.g., below a certain threshold) that is detectable by the initiator device 110(a). In this manner, the initiator device 110(a) may sense a load change that is caused by super-positioning of the two carrier signals RF1 and RF2 (e.g., rather than as a result of conventional load modulation of the initiator device 110(a)'s carrier signal RF1).

For another example, the target device 400 may indicate the first logic state by generating the second carrier signal RF2 concurrently with the first carrier signal RF1 generated by the initiator device 110(a), and may indicate the second logic state by turning off the second carrier signal RF2, as described in more detail below with respect to FIGS. 6C and 6D.

For some embodiments, the carrier phase control circuit 434 may include a look-up table (LUT) that stores a plurality of offset values that may be used to control the delay of a pulse-width modulated (PWM) signal provided to the power amplifier 432 via the gate drive circuit 433. An address value corresponding to (or derived from) the output clock signal CLK_PLL may be used to select one of these phase offset values from the LUT within the carrier phase control circuit 434. The carrier phase control circuit 434 may use a selected offset value to generate the PWM signal, which in turn is amplified by power amplifier 432 and provided to the antenna 410 via the matching network 420. Thus, the offset value selected in response to CLK_PLL may control the delay of the pulses of the PWM signal generated by the carrier phase control circuit 434.

The width of the pulses of the PWM signal may determine the data values to be transmitted to the initiator device 110(a) by modulation of the second carrier signal RF2 generated by the target device 400. More specifically, the width of the pulses of the PWM signal may control or adjust the amplitude of the second carrier signal RF2 transmitted by the target device 400.

The target device 400 may employ any suitable modulation technique including, for example, amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique.

Referring again to FIG. 5, the initiator device 110(a) detects the induced voltage on its antenna 111(a) resulting from the superposition of the first carrier signal RF1 and the second carrier signal RF2 (508), and may translate the induced voltage to decode data modulated onto the near field by the target device 400 (510). As described above, when the first and second carrier signals RF1 and RF2 are phase aligned, the initiator device 110(a) senses a stronger field, and when the first and second carrier signals RF1 and RF2 are misaligned, the initiator device 110(a) senses a weaker field. These two conditions may serve as an indication of data transmitted by the target device 400. Thus, although the initiator device 110(a) may sense a changing load, the changing load is a result of a superposition of the first and second carrier signals RF1 and RF2 (e.g., rather than as a result of conventional load modulation of the first carrier signal RF1 generated by the initiator device).

While the method depicted in the flow chart 500 includes a number of operations that appear to occur in a specific order, it should be apparent that the method 500 may include more or fewer operations, which may be executed serially or in parallel. An order of two or more operations may be changed and two or more operations may be combined into a single operation.

Figure 6A:
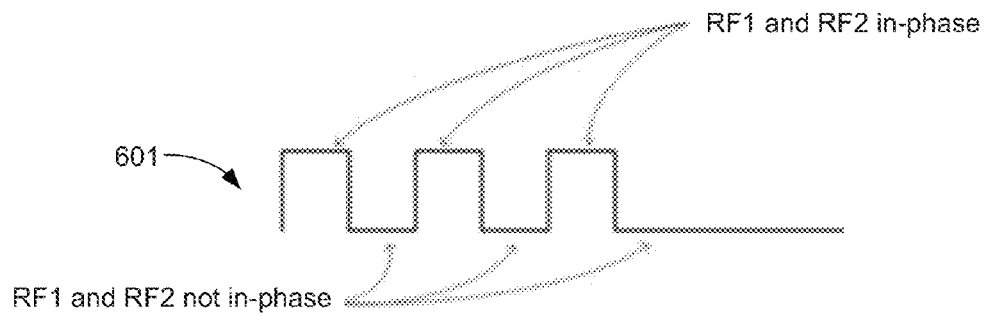
FIGS. 6A-6D are waveform diagrams depicting on-off keying (OOK) encoding operations employed by some embodiments.

FIGS. 6A-6D are waveform diagrams depicting exemplary on-off keying (OOK) encoding operations that may be performed by the target device 400 for some embodiments. For example, FIG. 6A depicts a waveform 601 for a sub-carrier signal (e.g., having a frequency of 847 kHz) associated with OOK modulation. When the first and second carrier signals RF1 and RF2 are in-phase with each other, the resulting sub-carrier signal waveform 601 is at a relatively high value (e.g., to indicate a first data bit value). Conversely, when the first and second carrier signals RF1 and RF2 are not in-phase with each other, the sub-carrier signal waveform 601 is at a relatively low value (e.g., to indicate a second data bit value). In addition, the particular sequence of relatively high values and relatively low values of the waveform 601 may be used to indicate encoded bit values.

Figure 6B:
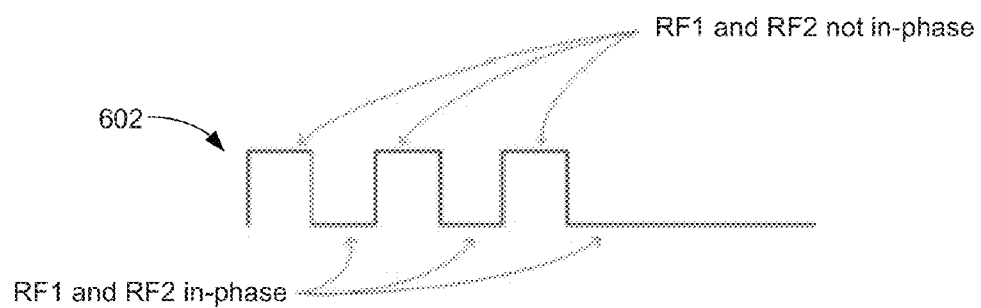

FIG. 6B depicts a waveform 602 for a sub-carrier signal (e.g., having a frequency of 847 kHz) that is inverted with respect to the waveform 601 depicted in FIG. 6A. Thus, when the first and second carrier signals RF1 and RF2 are in-phase with each other, the resulting sub-carrier signal waveform 602 is at a relatively low value (e.g., to indicate the second data bit value). Conversely, when the first and second carrier signals RF1 and RF2 are not in-phase with each other, the sub-carrier signal waveform 602 is at a relatively high value (e.g., to indicate the first data bit value). In addition, the particular sequence of relatively high values and relatively low values of the waveform 602 may be used to indicate encoded bit values.

Figure 6C:
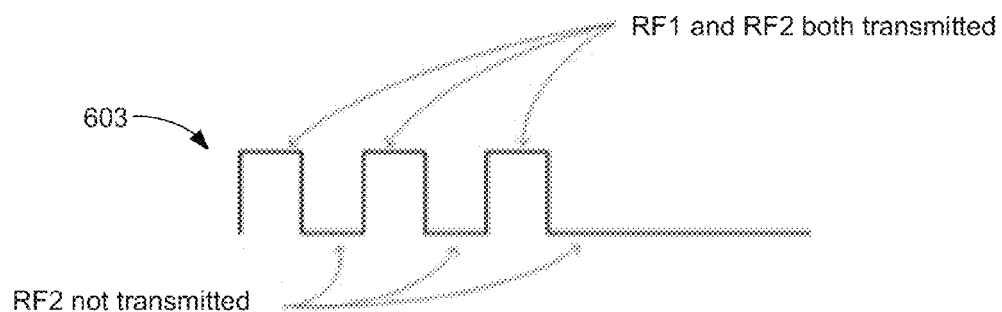

FIG. 6C depicts a waveform 603 for another sub-carrier signal (e.g., having a frequency of 847 kHz) associated with OOK modulation. When the first and second carrier signals RF1 and RF2 are both transmitted simultaneously, the resulting sub-carrier signal waveform 603 is at a relatively high value (e.g., to indicate a first data bit value). Conversely, when the second carrier signal RF2 is not transmitted, the sub-carrier signal waveform 603 is at a relatively low value (e.g., to indicate a second data bit value). In this manner, the target device 400 may convey the first data bit value to the initiator device 110(a) by transmitting the second carrier signal RF2, and may convey the second data bit value to the initiator device 110(a) by not transmitting (e.g., briefly terminating) the second carrier signal RF2. In other words, for at least one embodiment, the target device 400 may transmit data to the initiator device 110(a) by intermittingly terminating the second carrier signal RF2 while still receiving the first carrier signal RF1. In addition, the particular sequence of relatively high values and relatively low values of the waveform 603 may be used to indicate encoded bit values.

Figure 6D:
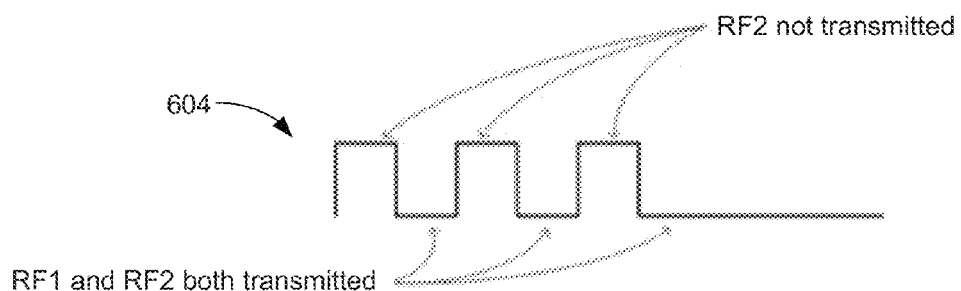

FIG. 6D depicts a waveform 604 for a sub-carrier signal (e.g., having a frequency of 847 kHz) that is inverted with respect to the waveform 603 depicted in FIG. 6C. Thus, when the first and second carrier signals RF1 and RF2 are both transmitted simultaneously, the resulting sub-carrier signal waveform 604 is at a relatively low value (e.g., to indicate the second data bit value). Conversely, when the second carrier signal RF2 is not transmitted, the sub-carrier signal waveform 604 is at a relatively high value (e.g., to indicate the first data bit value). In this manner, the target device 400 may convey the first data bit value to the initiator device 110(a) by not transmitting (e.g., briefly terminating) the second carrier signal RF2, and may convey the second data bit value to the initiator device 110(a) by transmitting the second carrier signal RF2. In addition, the particular sequence of relatively high values and relatively low values of the waveform 604 may be used to indicate encoded bit values.

FIG. 7A depicts a waveform 701 for a sub-carrier signal associated with binary phase-shift keying (BPSK) encoding operations that may be performed by the target device 400. When the first and second carrier signals RF1 and RF2 are in-phase with each other, the resulting sub-carrier signal waveform 701 is at a relatively high value (e.g., to indicate a first data bit value). Conversely, when the first and second carrier signals RF1 and RF2 are not in-phase with each other, the sub-carrier signal waveform 701 is at a relatively low value (e.g., to indicate a second data bit value). In addition, the particular sequence of relatively high values and relatively low values of the waveform 701 may be used to indicate encoded bit values. For example, the first sequence appearing to the left of the dashed line in FIG. 7A may indicate a first encoded bit value, while the second sequence appearing to the right of the dashed line in FIG. 7A may indicate a second encoded bit value.

FIG. 7B depicts a waveform 702 for a sub-carrier signal associated with frequency shift keying (FSK) encoding operations that may be performed by the target device 400. When the first and second carrier signals RF1 and RF2 are in-phase with each other, the resulting sub-carrier signal waveform 702 is at a relatively high value (e.g., to indicate a first data bit value). Conversely, when the first and second carrier signals RF1 and RF2 are not in-phase with each other, the sub-carrier signal waveform 702 is at a relatively low value (e.g., to indicate a second data bit value). In addition, the particular sequence of relatively high values and relatively low values of the waveform 702 may be used to indicate encoded bit values.

FIG. 7C depicts a waveform 703 for a signal associated with Manchester encoding operations that may be performed by the target device 400. When the first and second carrier signals RF1 and RF2 are in-phase with each other, the resulting signal waveform 703 is at a relatively high value (e.g., to indicate a first data bit value). Conversely, when the first and second carrier signals RF1 and RF2 are not in-phase with each other, the resulting signal waveform 703 is at a relatively low value (e.g., to indicate a second data bit value). In addition, the particular sequence of relatively high values and relatively low values of the waveform 703 may be used to indicate encoded bit values.

FIG. 8 is a table 800 summarizing the encoding and modulation modes (with or without using the sub-carrier signal) that the target device 400 may employ, as described above with respect to FIGS. 6A-6D and 7A-7C. For the table 800, the column labeled "envelope high level" corresponds to the relatively high level depicted in the waveforms of FIGS. 6A-6D and 7A-7C, and the column labeled "envelope low level" corresponds to the relatively low level depicted in the waveforms of FIGS. 6A-6D and 7A-7C.

Figure 9:
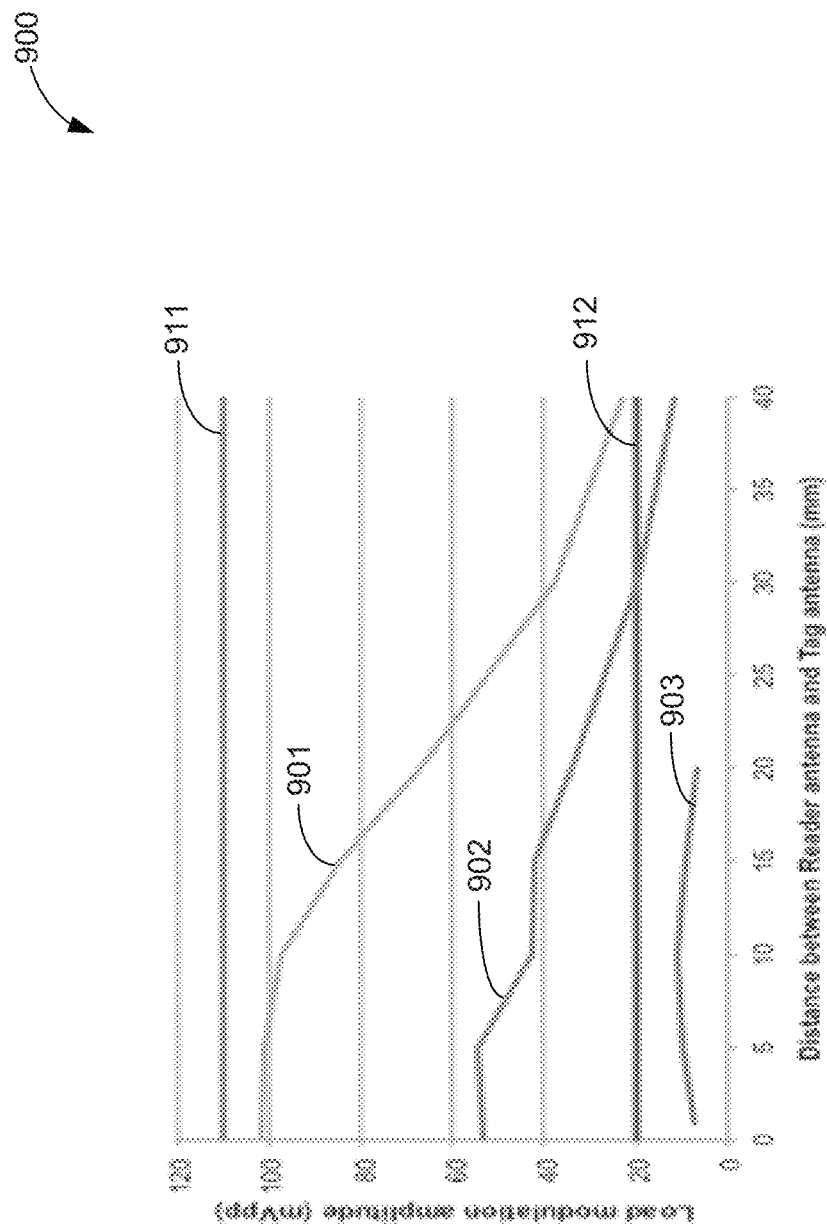
FIG. 9 is a graph comparing power transmission levels of NFC operations performed in accordance with the present embodiments with power transmission levels of conventional NFC passive communication mode operations.

FIG. 9 is a graph 900 comparing load modulation transmission levels of NFC operations performed according to the present embodiments with load modulation transmission levels of NFC operations performed according to conventional NFC passive communication modes. The load modulation level of NFC transmissions performed when target device 400 is operating at full power in accordance with the present embodiments is represented by a curve 901, the load modulation level of NFC transmissions performed when target device 400 is operating at half full power in accordance with the present embodiments is represented by a curve 902, and the power level of NFC transmissions performed in accordance with conventional NFC passive communication mode operations is represented by a curve 903. Line 911 depicts an upper load modulation level limit provided by current NFC standards, and line 912 depicts a lower load modulation level limit provided by current NFC standards.

Specifically, the graph 900 may indicate that for a given antenna size in the target device 400, the amplitude of the resulting waveform detected in the initiator device is almost 10 times greater than the amplitude of signals detected by the initiator device during conventional NFC passive communication mode (e.g., using conventional load modulation). As a result, the size of the target device's antenna may be reduced without performance degradation by using NFC passive communication mode operations described herein.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of operating a near-field communication (NFC) device as a target device during an NFC session, the method comprising:
   receiving a polling command from an initiator device requesting a passive communication mode for the NFC session;
   receiving a first carrier signal from the initiator device during the NFC session, the first carrier signal remaining un-modulated after the polling command is received;
   transmitting a second carrier signal from the target device to the initiator device while the first carrier signal is being received by the target device and remains un-modulated; and
   modulating data onto the second carrier signal, the first carrier signal and the second carrier signal combining to form a composite waveform indicative of the modulated data, wherein the composite waveform is a superposition of the first carrier signal and the second carrier signal.

2. The method of claim 1, wherein the target device continuously receives the first carrier signal and continuously transmits the second carrier signal during the NFC session.

3. The method of claim 1, wherein an amplitude of the composite waveform indicates a phase relationship between the first carrier signal and the second carrier signal.

4. The method of claim 3, wherein the target device is to modulate the data by adjusting the phase relationship between the first carrier signal and the second carrier signal.

5. The method of claim 1, wherein the transmitting comprises:
   extracting clock information from the received first carrier signal; and
   generating the second carrier signal using the extracted clock information.

6. The method of claim 1, wherein the modulating comprises:
   adjusting a phase of the second carrier signal to encode the data onto the second carrier signal.

7. The method of claim 1, wherein the modulating comprises:
   adjusting an amplitude of the second carrier signal to encode the data onto the second carrier signal.

8. The method of claim 1, wherein the modulating comprises:
   intermittingly terminating the second carrier signal while still receiving the first carrier signal.

9. A non-transitory computer-readable medium containing program instructions that, when executed by a processor of a target device during a near-field communication (NFC) session, cause the target device to:
   receive a polling command from an initiator device requesting a passive communication mode for the NFC session;
   receive a first carrier signal from the initiator device during the NFC session, the first carrier signal remaining un-modulated after the polling command is received;

transmit a second carrier signal from the target device to the initiator device while the first carrier signal is being received by the target device and remains un-modulated; and modulate data onto the second carrier signal, the first carrier signal and the second carrier signal to combine to form a composite waveform indicative of the modulated data, wherein the composite waveform is a super-position of the first carrier signal and the second carrier signal.

10. The non-transitory computer-readable medium of claim 9, wherein execution of the program instructions further causes the target device to:

continuously receive the first carrier signal during the NFC session; and continuously transmit the second carrier signal during the NFC session.

11. The non-transitory computer-readable medium of claim 9, wherein an amplitude of the composite waveform indicates a phase relationship between the first carrier signal and the second carrier signal.

12. The non-transitory computer-readable medium of claim 11, wherein the target device is to modulate the data by adjusting the phase relationship between the first carrier signal and the second carrier signal.

13. The non-transitory computer-readable medium of claim 9, wherein execution of the program instructions to transmit the second carrier signal causes the target device to:

extract clock information from the received first carrier signal; and generate the second carrier signal using the extracted clock information.

14. The non-transitory computer-readable medium of claim 9, wherein execution of the program instructions to modulate the second carrier signal causes the target device to:

adjust a phase of the second carrier signal to encode the data onto the second carrier signal.

15. The non-transitory computer-readable medium of claim 9, wherein execution of the program instructions to modulate the second carrier signal causes the target device to:

adjust an amplitude of the second carrier signal to encode the data onto the Second carrier signal.

16. The non-transitory computer-readable medium of claim 9, wherein execution of the program instructions to modulate the second carrier signal causes the target device to:

intermittingly terminate the second carrier signal while still receiving the first carrier signal.

17. A near-field communication (NFC) device configured to operate as a target device during an NFC session, the NFC device comprising:

means for receiving a polling command from an initiator device requesting a passive communication mode for the NFC session;

means for receiving a first carrier signal from the initiator device during the NFC session, the first carrier signal remaining un-modulated after the polling command is received;

means for transmitting a second carrier signal from the target device to the initiator device while the first carrier signal is being received by the target device and remains un-modulated; and means for modulating data onto the second carrier signal, the first carrier signal and the second carrier signal combining to form a composite waveform indicative of the modulated data, wherein the composite waveform is a super-position of the first carrier signal and the second carrier signal.

18. The NFC device of claim 17, wherein the target device is to continuously receive the first carrier signal and is to continuously transmit the second carrier signal during the NFC session.

19. The NFC device of claim 17, wherein an amplitude of the composite waveform indicates a phase relationship between the first carrier signal and the second carrier signal.

20. The NFC device of claim 19, wherein the target device is to modulate the data by adjusting the phase relationship between the first carrier signal and the second carrier signal.

21. The NFC device of claim 17, wherein the means for transmitting is to:

extract clock information from the received first carrier signal; and generate the second carrier signal using the extracted clock information.

22. The NFC device of claim 17, wherein the means for modulating is to adjust a phase of the second carrier signal to encode the data onto the second carrier signal.

23. The NFC device of claim 17, wherein the means for modulating is to adjust an amplitude of the second carrier signal to encode the data onto the second carrier signal.

24. The NFC device of claim 17, wherein the means for modulating is to intermittingly terminate the second carrier signal while still receiving the first carrier signal.

* * * * *